United States Patent [19]

Baker et al.

[11] Patent Number: 4,943,475
[45] Date of Patent: Jul. 24, 1990

[54] MULTILAYER COMPOSITE PROTECTIVE FABRIC MATERIAL AND USE IN PROTECTIVE CLOTHING

[75] Inventors: Richard W. Baker; Paul Shrock, both of Menlo Park, Calif.

[73] Assignee: Membrane Technology & Research, Inc., Menlo Park, Calif.

[21] Appl. No.: 890,378

[22] Filed: Jul. 23, 1986

[51] Int. Cl.$^5$ .............................................. B32B 7/00
[52] U.S. Cl. ................................... 428/246; 427/340;
427/341; 427/342; 427/389.9; 427/412;
428/252; 428/253; 428/282; 428/284; 428/286;
428/315.5; 428/315.7; 428/315.9; 428/332;
428/421; 428/422; 428/447; 428/448; 428/913
[58] Field of Search .................... 427/389.9, 412, 337,
427/340, 341, 342; 428/290, 315.5, 315.7, 315.9,
246, 421, 422, 423.1, 448, 913, 252, 253, 282,
284, 286, 332, 447

[56] References Cited

U.S. PATENT DOCUMENTS

| | | | |
|---|---|---|---|
| 3,769,144 | 10/1973 | Economy et al. | 161/50 |
| 4,201,822 | 5/1980 | Cowsar | 428/240 |
| 4,217,386 | 8/1980 | Arons et al. | 428/198 |
| 4,234,701 | 1/1981 | Riley et al. | 427/244 |
| 4,433,024 | 2/1984 | Eian | 428/198 |
| 4,460,641 | 7/1984 | Barer et al. | 428/246 |
| 4,469,744 | 9/1984 | Grot et al. | 428/246 |
| 4,513,047 | 4/1985 | Leach et al. | 428/175 |
| 4,515,761 | 5/1985 | Plotzker | 423/240 |
| 4,518,650 | 5/1984 | Grot et al. | 428/286 |
| 4,565,727 | 1/1986 | Giglia et al. | 428/172 |

OTHER PUBLICATIONS

V. Stannett et al., "Permeability of Plastic Films and Coated Paper to Gases and Vapors", Tappi Monograph #23, New York (1962).
J. Hilderbrand and R. Scott, "The Solubility of Non--Electrolytes", Reinhold Publishing Corp., New York, (1949).
R. L. Riley et al., "Preparation of Ultrathin Reverse Osmosis Membranes and the Attainment of the Theoretical Salt Rejection", J. Appl. Poly. Sci. 11, 2143 (1967).
L. T. Rozelle et al., "Non-Polysaccharide Membranes for Reverse Osmosis: NS-100 Membranes", in Reverse Osmosis and Synthetic Membranes, S. Sourirajan (ed.), National Research Council of Canada, Ottawa (1977).
H. Strathmann et al., "The Formation of Asymmetric Membranes", Desalination, 16, 175 (1975).
R. W. Baker and H. K. Lonsdale, "Controlled Release Mechanisms and Rates" in Controlled Release of Biologically Active Agents.
A. C. Tanquery and R. E. Lacey (eds.) Plenum Press, New York (1974).
R. W. Baker and I. Blume, "Permselective Membranes Separate Gases", CHEMTECH, 16, 232-239 (1986).
R. M. Barrer and G. Skirrow, "Transport and Equilibrium Phenomena in Gas-Elastomer Systems. I. Kinetic Phenomena", J. Poly. Sci., 3, 549 (1948).

Primary Examiner—James J. Bell
Attorney, Agent, or Firm—J. Farrant

[57] ABSTRACT

A multilayer composite fabric material consisting of a woven or non-woven fabric support, a microporous membrane layer, and an ultrathin permselective surface coating, and optionally an intermediate sealing layer and a protective top layer; the material being freely permeable to water vapor but impermeable to toxic organic vapors.

The material is suitable for fabricating protective clothing for use in industrial and military hazardous chemical enviornments.

22 Claims, 4 Drawing Sheets

MULTILAYER COMPOSITE PROTECTIVE FABRIC MATERIAL AND USE IN PROTECTIVE CLOTHING

This invention was made with Government support under Contract Number FO 4701-84-C-0104, awarded by the Department of the Air Force, AFSC Space Division. The Government has certain rights in this invention.

BACKGROUND OF THE INVENTION

1. Field of the Invention

This invention relates to a multilayer composite fabric material comprising a fabric support layer and a composite permselective membrane layer, which is permeable to water vapor, but impermeable to toxic organic vapors. The invention further relates to protective garments fabricated from this material.

2. Description of the Prior Art

There are many situations in modern industrial and military setting where personnel need protection from toxic materials to which they may be exposed, either as an ongoing part of the work environment, or as a result of accident or emergency.

A range of protective garments is now available for use in such hazardous conditions, where the potential or actual release of highly toxic organic vapors and liquids poses a threat to the health and safety of the workforce.

Gear currently used to safeguard workers in these surroundings consists of protective masks, hoods, clothing, gloves and footwear. This equipment, when made from rubber or plastic, can be completely impervious to hazardous chemicals. Unfortunately, these materials are also impervious to air and water vapor, and thus retain body heat, exposing their wearer to heat stress which can build quite rapidly to a dangerous level.

Another approach to protective clothing, well known in the art, is the use of garments manufactured from a laminated fabric incorporating activated carbon, which has the ability to sorb toxic vapors and prevent penetration to the skin. Examples of this method include U.S. Pat. Nos. 3,769,144 to Economy et al., 4,217,386 to Arons et al., 4,433,024 to Eian, 4,513,047 to Leach et al. and 4,565,727 to Giglia et al. The main disadvantage of this approach is that the fabrics lose their sorptive properties with time. As active carbon sites become saturated, the garment becomes unreliable and presents a decontamination problem in addition. In some embodiments it has been shown that the absorption of perspiration from the user can reduce the amount of available carbon to such an extent that the garment becomes unsafe after a use period of only a few hours. Furthermore, these laminates often rely on a layer of polyurethane foam to hold the carbon particles or fibers, a technique which introduces a fire hazard, since some polyurethane foams are highly flammable. The production of these laminates is costly and complex, and the resulting material may have undesirable properties such as flammability, low thermal conduction, and limited life of the polyurethane layer.

Chemical de-activation, using materials treated with reactive decontaminants such as chloroamide, is another possibility, of which U.S. Pat. No. 2,968,675 is a typical example. However, chloroamide-treated fabrics deteriorate over time, necessitating regular inspection and possible reimpregnation. In addition, these fabrics liberate hypochlorite when exposed to perspiration or other moisture, and can cause unacceptable levels of skin irritation to the wearer.

The use of modern semipermeable membranes, as developed for use in the separation of gases or liquids, as a constituent of the protective material is a newer approach which has been exploited to a very limited extent to date. U.S. Pat. No. 4,201,822 to Cowsar discloses a fabric containing known reactive chemical decontaminants, which are encapsulated in microparticles bonded to the fabric. The microparticle walls are permeable to toxic vapors, but impermeable to decontaminants, so that the toxic agents diffuse selectively into the particles, where they are rendered harmless. Encapsulating the active agent in this way avoids the liberation of hypochlorite, and subsequent skin irritation, that has been shown to be a problem with clothing treated with chloroamide. Employing a similar concept, U.S. Pat. No. 4,460,641 to Barer et al., discloses the use of microporous hollow fibers, whose lumina are filled with one or more chemical neutralizing agents, to form one layer of a protective fabric. Of course in both these cases, the decontaminant agent will still become exhausted with time.

The deployment of a synthetic polymeric membrane as a barrier to the permeation of organic vapors, rather than as a means of absorption, is disclosed for example in U.S. Pat. Nos. 4,469,744 and 4,518,650 to Grot et al., and 4,515,761 to Plotzker, all assigned to DuPont. In these patents, the ability of the composite fabric to reject toxic organic agents resides in a layer of semipermeable highly fluorinated ion exchange polymer, which is permeable to water vapor, but relatively impermeable to a broad range of organic vapors. In this way, the user can remain cool and comfortable, but enjoys protection from harmful agents. The main disadvantage of these garments is in the measure of their impermeability. While they are adequate for protection in many industrial applications, their organic vapor transmission rates depend on the molecular weight of the substance involved, and may be far in excess of recommended safe exposure levels for potent toxic agents with low molecular weights.

Thus there still exists a very real demand for improved protective clothing that can offer acceptable levels of impermeability to highly toxic organic vapors of low molecular weight, while minimizing the discomfort and heat stress that accompanies the use of conventional rubber or plastic protective suits. The protective fabric material of the present invention represents a novel application of the technology of multilayer composite membranes to the solution of this problem, and provides a material suitable for fabrication into garments with superior toxic vapor rejection characteristics, combined with good water vapor transmission properties.

SUMMARY OF THE INVENTION

It is an object of the present invention then to provide an improved protective fabric material, with enhanced rejection characteristics for organic vapors, aerosols and liquids, in particular low molecular weight organic vapors of high toxicity.

It is a second object of the invention to provide improved protective garments fabricated from the new material, which will be freely permeable to water vapor from the body, thereby minimizing heat stress to the wearer.

It is another object of the invention to provide that the fabric and garments made therefrom be stable over long periods of time, in other words that they should not be subject to chemical deterioration or saturation, and that they should be sufficiently rugged to withstand extended use.

It is yet another object of the invention that the new material have a smooth, non-absorbent surface so that cleaning is simple.

It is yet another object of the invention that garments made from the new material should afford a measure of emergency fire protection to the user.

It is yet another object that the material of the invention should be economical to produce in commercial quantities and amenable to manufacture of protective garments by conventional techniques well established in the art.

Additional objects and advantages will be apparent from the description of the invention to those skilled in the art.

To achieve the foregoing objects, the present invention provides for a synthetic, multilayer, composite material which is constructed employing the technology used to produce modern gas and liquid separation membranes. The material consists essentially of a fabric web, onto which a multilayer composite membrane is coated. Typically, the first layer of the membrane consists of a microporous support membrane that gives strength to the composite and provides a surface onto which a second layer is deposited. Preferentially, but not essentially, this second layer is a sealing layer that creates a very smooth, defect-free surface. The third layer, which provides the permselective properties of the material, is an ultrathin hydrophilic dense polymer coating. In some cases, it may be desirable to coat the permselective layer with another thin sealing layer. The object of this is to protect the permselective membrane and to make garments fabricated from the composite material more robust and long-lasting.

The fabric web should be chosen for its performance in areas such as feel, comfort, mechanical strength, ease of tailoring and flame resistance. The microporous support membrane should be finely porous, freely permeable to body moisture, not subject to attack by the organic solvents used to apply the other layers of the composite membrane, and should impart good fire-protection properties to the material. The optional intermediate sealing layer should provide a smooth surface onto which a defect-free permselective layer can be coated. It should not impede the water vapor transmission properties of the composite material. The properties demanded of the optional top protective layer are similar. Normally, the permselective layer should be a hydrophilic polymer with a high permeability to water vapor. It should be crosslinked or glassy in nature, rather than rubbery, in order to act an an effective impermeable barrier for toxic organic agents. Furthermore, it should have a dense non-porous structure that renders it impermeable to toxic agents in liquid or aerosol form.

Preparation of the composite membrane material can be achieved by a number of methods. The most preferred choice is to use a coating procedure similar to those known in the art for the production of silicone rubber gas separation membranes. An alternative preferred method is to use interfacial polymerization, which produces a highly crosslinked polymer layer. A preferred option for forming the microporous support layer is to make an integral asymmetric membrane known as the Loeb-Sourirajan type, described for example in articles such as "Permselective membranes separate gases", by Richard W. Baker and Ingo Blume, ChemTech 16, 232, (1986). Other methods of making composite membrane structures may be used, such as plasma polymerization, radiation grafting etc., but these would not normally be the preferred methods.

The finished material can be used to make protective suits or individual garments by any of the methods already established in the art, such as sewing, or sealing by heat or RF.

It is to be understood that both the general description above and the detailed description that follows are intended to be exemplary and explanatory, but do not restrict the scope of the invention in any way.

BRIEF DESCRIPTION OF THE DRAWINGS

FIG. 1 shows a schematic representation of the proposed organic vapor impermeable, water vapor permeable composite material.

DETAILED DESCRIPTION OF THE INVENTION

The term "hydrophilic" as used herein refers to polymer films which have the ability to transport large volumes of water vapor through the film, by absorbing water on the side where the water vapor concentration is high, and desorbing or evaporating it on the side where the water vapor concentration is low. These dense continuous polymeric layers are not hydrophilic in the general sense of transporting water by capillary action or by wicking.

The term "fabric" as used herein is intended to be a general term encompassing any fabricated material, whether woven, non-woven or otherwise constructed.

The term "permselective" as used herein refers to polymers, or membranes made from those polymers, that exhibit selective permeation for at least one gas in a mixture over another gas in that mixture, enabling a measure of separation between those gases to be achieved.

Figures 1A, 1B, 1C:
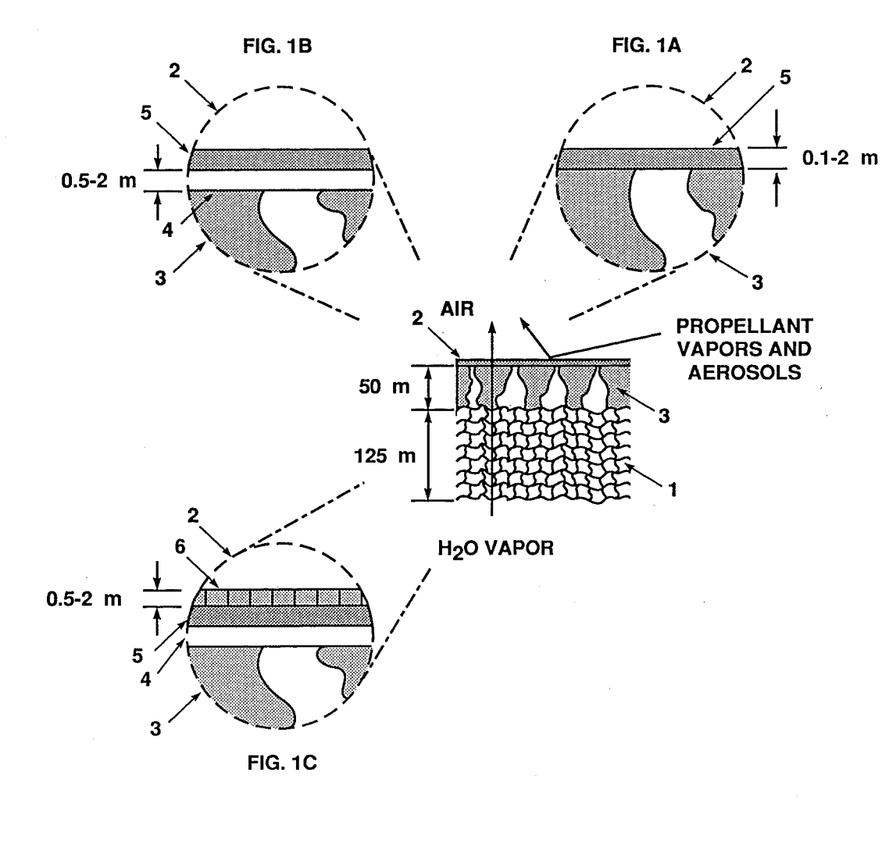
FIG. 1A shows a basic embodiment, without sealing or protective layers.
FIG. 1B shows an alternative embodiment, incorporating an intermediate sealing layer.
FIG. 1C shows an alternative embodiment, incorporating both an intermediate sealing layer and a protective top layer.

Referring now to the drawings, FIG. 1 shows a schematic representation of three typical embodiments of the proposed composite fabric material. FIG. 1A shows a basic embodiment, without sealing or protective layers. FIG. 1B shows an alternative embodiment, incorporating an intermediate sealing layer. FIG. 1C shows another alternative, incorporating both an intermediate sealing layer and a protective top layer. In each case, the material comprises a fabric web 1, onto which a multilayer composite membrane 2 is coated. The first layer 3 is a microporous support membrane that serves to strengthen the composite, but has no selective properties. In some cases, depending on the structure of the chosen polymer and parameters of the fabrication process, the microporous support may be sufficiently smooth that the hydrophilic layer may be deposited directly on the support. If this is not possible, then an intermediate sealing layer is used. This second layer 4 is a thin sealing coat, whose function is to form an extremely smooth, defect-free coating onto which the permselective layer 5 may be deposited. The permselective layer 5 is an ultrathin dense polymer coating. This coating determines the permeability characteristics of the composite membrane. This layer is permeable to water vapor but significantly less permeable to toxic organic substances. This makes it possible to manufacture garments from the material that are comfortable to wear, while protecting the user from hazardous chemical environments. An optional top layer 6 protects the permselective layer from damage by abrasion and so on, and thereby increases the ruggedness of garments made from the composite material.

The finished composite material should approach the ideal state of unrestricted passage of water vapor, combined with complete impermeability to toxic vapors, as closely as possible.

Table 1 shows average perspiration rates for individuals at different activity levels and ambient temperatures.

TABLE I

| Activity | Temperature (°C.) | Perspiration rate (g/m².hr) |
|---|---|---|
| At rest | 22 | 25 |
| Indoor laboratory work | 29 | 125 |
| Moderate activity in shade | 30–35 | 250 |
| Heavy labor | 28–35 | 700 |
| Marching with load | 32 | 1000 |

Based on these figures, a reasonable minimum acceptable water vapor transmission rate should be at least 100 g/m². hr and the preferred value should be 200 g/m².hr or above.

To determine the maximum acceptable toxic vapor permeability, both the Emergency Exposure Limit (EEL) and the Threshold Limit Value (TLV) should be considered. For highly toxic vapors, such as might be encountered for instance in chemical warfare, as propellants in the aerospace industry, or as agricultural pesticides, the EEL may be as low as 10 ppm for exposure time of one hour, and the TLV, based on a time-weighted average, may be 1 ppm or less. These figures may be translated into permeability data using the equation:

$$T = \frac{EEL \cdot V}{ACt} \quad (1)$$

where T is the target permeability, V is the volume of the garment(cm³), A is the surface area of the garment(cm²), C is the challenge concentration in ppm and t is exposure time (sec). Assuming an emergency concentration of toxic vapor in the air of 50 ppm for one hour, this equation yields a maximum allowable permeation rate of $2.8 \times 10^{-4}$ cm/sec. Where the challenge concentration rises to 500 ppm, the corresponding target permeability falls to $2.8 \times 10^{-5}$ cm/sec. Permeability figures of this order would provide adequate protection to workers exposed to the TLV concentration on an ongoing basis. After eight hours, the toxic vapor concentration inside the suit would not exceed 16% of the TLV value.

Based on these figures, it can be seen that the maximum acceptable organic vapor permeability rate should be of the order of $10^{-4}$ cm/sec, and the preferred value should be $10^{-5}$ cm/sec or below.

To achieve these target values, and the objects of the invention described above, specific characteristics are demanded of the several layers comprising the composite protective fabric.

The fabric web determines properties such as ease of tailoring, feel, comfort, mechanical strength and flame resistance. Possible choices for this layer include, but are not limited to, conventional clothing fabrics such as cotton, wool, linen or nylon; polyesters such as polyethylene terephthalate; polyamides such as Nylon 66, Nomex ® (DuPont, Wilmington, Del.) and aromatic polyamides; polyolefins including polyethylene, polypropylene and polytetrafluoroethylene; acrylics, for example polyacrylonitrile; polyimides, and combinations of the above. Furthermore, the fabric web may be woven, knitted, non-woven, spun-bonded, felted or otherwise constructed. For good comfort and flexibility, it should preferably be porous or microporous, with a pore size of the order of up to a few microns. More preferably, it should combine these qualities with good flame resistance. Especially preferred choices for the fabric web are Hollytex ®, a non-woven polyester fabric (Eaton Dikeman, Mt. Holly Springs, Pa.), Nomex ®, a polyamide with good flame resistance, and Tyvek ®, a spun-bonded polyethylene (both from E. I. DuPont de Nemours, Wilmington, Del.). Where cost is not a governing factor, the best combination of mechanical strength, comfort and flame resistance is offered by microporous PTFE( Goretex ® or Microtex ®, W. L. Gore and Associates, Inc., Elkton, Md.). The thickness of the fabric web is not critical, but should generally be from about 100–200 microns, a typical value being 125 microns.

The microporous support layer is necessary because the second sealing layer cannot be deposited directly onto the fabric web, whose coarse structure would be completely permeated by the sealing polymer. The microporous substrate has no permselective properties per se, but provides strength and toughness to the composite material. It should have a flow resistance that is very small compared to the permselective barrier layer. The surface pore size should preferably be 1 micron or smaller. In addition, the material of which it is made should be capable of withstanding attack by the solvents used to apply the subsequent layers of the composite membrane. Polymers which may be used to make the support membrane include, but are in no way limited to, polysulfones, such as Udel ® P3500 (Union Carbide, Danbury, Conn.) or NTU ®3050 (Nitto Electric Industrial Co., Osaka, Japan), a solvent resistant ultrafiltration membrane; polyamides, for example Nomex ®(DuPont, Wilmington, Del.); crosslinked polyimides, for instance NTU ®4220 (Nitto Electric Industrial Co., Osaka, Japan); or polyetherether ketones, such as Victrex ®(ICI Americas Inc., Wilmington, Del.). Other suitable support membranes are those described in an article by H. Strathmann, K. Kock, P. Amar and R. W. Baker, in "The Formation Mechanism of Asymmetric Membranes", *Desalination* 16, 175

(1975). Further examples of polymers which may be used to prepare the microporous support layer may be found among those listed in U.S. Pat. No. 4,230,463 to Henis and Tripodi, column 14, lines 14 through 54, which is incorporated herein by reference. Because many of the film-forming materials used for the permselective layer are soluble only in aggressive solvents such as methylene chloride, toluene or tetrahydrofuran, a particularly preferred choice for the microporous support layer is a polyvinylidine fluoride, such as Kynar ® (Pennwalt Corporation, Philadelphia, Pa.), which is not attacked by these solvents. Alternatively PI ®-2080 (Upjohn, North Haven, Connecticut), a solvent-resistant polyimide is a good choice. The support membrane should be sufficiently thick to provide the finished fabric with a measure of robustness to withstand normal use, but not so thick as to impair the flexibility or permeability characteristics. Generally a thickness of 30-200 microns, is envisaged, with preferred thickness of approximately 50 microns.

The purpose of the optional second layer is to provide a sealing coat for the microporous support, thereby ensuring a very smooth defect-free surface onto which the permselective layer can be deposited. As a result the permselective layer need neither have any mechanical strength, nor be completely defect-free, making an ultrathin, high-flux top coating possible. Desirable materials for use as the sealing layer should have a high permeability for water vapor, so as not to reduce the body-fluid transport efficiency of the composite membrane. They should also be capable of wetting the microporous layer in such a way as to form a smooth, continuous coat. In general, rubbery materials are preferred, because of their permeability and flexibility properties. Examples of suitable choices which may be mentioned include natural and synthetic rubbers; poly(siloxanes), for instance poly(dimethylsiloxane), poly(phenylmethylsiloxane), poly(trifluoropropylmethylsiloxane) and copolymers of methylstyrene and dimethylsiloxane, vulcanized and unvulcanized silicone rubbers, polyisoprene, polychloroprene, and the like. Preferred choices are the high temperature rubbers, for example nitrile rubber, neoprene, poly(dimethylsiloxane), chlorosulfonated polyethylene, polysilicone-carbonate copolymer, fluoroelastomer, cis-polybutadiene, cispolyisoprene, and poly(butene-1). The most preferred material for the sealing coat is silicone rubber, which has good permeability characteristics, is fire resistant and wets the microporous support freely in solution. Solvents that may be used for silicone rubber include liquid alkanes, for example pentane, cyclohexane, trimethylpentane; aliphatic alcohols such as methanol; dialkyl ethers, freon, toluene, methylene chloride, tetrahydrofuran, etc. Silicone rubbers are stable up to temperatures around 200° C., and thus provide better fire protection than rubbers with lower melting points. Constituents for preparing silicone rubber, such as polymerizable oligomers or linear polymers, may be obtained from General Electric Co., Waterford, N.Y., or Dow Corning Co. Midland, Mich.) Silicone rubber is very permeable, and silicone rubber layers can easily be made thin enough by the techniques hereinafter described in detail to allow a high water vapor flux. The thickness of the sealing layer should preferably be less than five microns, generally in the range 0.5 to 2 microns, and ideally 1 micron or less. In embodiments employing a protective top layer, the above discussion of properties, choices of polymers and so on, would also apply to the selection of an appropriate top surface layer.

Selection of an appropriate material for the permselective layer of the composite material is critical, since it is this layer that determines the permeability and rejection properties of the finished garment. Because of its dense, non-porous structure, the coating will be impermeable to liquids and aerosols. It must have the best possible rejection characteristics for highly toxic organic vapors, while remaining sufficiently permeable to water vapor to prevent the onset of heat stress in the user. A difference in membrane permeability between these two permeants of at least a factor of ten, and preferably of the order of $10^3$ or even more is necessary. A measure of emergency fire protection is also highly desirable.

Permeation rates through dense membranes of this type are given by the equation:

$$J = \frac{DK\Delta C}{l} \quad (2)$$

where J is the transmembrane flux (g/cm$^2$.sec), $\Delta C$ is the concentration gradient of permeant across the membrane (g/cm$^3$), l is the membrane thickness (cm), D is the diffusion coefficient of the permeant in the membrane (reflecting the mobility of the permeant), and K is the partition factor (reflecting the solubility of the permeant in the membrane).

To obtain the required difference in the flux of water vapor and organic vapors through the membrane material, the values of D and K must be maximized for water and minimized for organic vapors. In very flexible backbone polymers, such as silicone rubber, the forces restraining the reorientation of the polymer chains to allow passage of the permeant are low, and thus the diffusion coefficient of both permeants is very high. Diffusion coefficients in silicone rubber also decrease only slowly as the molecular weight of the permeant is increased. In contrast, the forces restraining reorientation of polymer chains in rigid polymers are much larger. As a result, diffusion coefficients of larger permeants in these polymers are much lower than in silicone rubber. Moreover, because the number of polymer chains required to reorientate increases as the size of the permeant increases, diffusion coefficients decrease very rapidly with increasing molecular size. Even relatively small organic molecules, such as hydrazine or nitrogen tetroxide, both highly toxic agents used as propellants in the aerospace industry, will be many times less permeable through these rigid polymers than the small, highly polar and condensable water molecule. It follows that the separation of permeants such as water and organic vapors can best be achieved with polymers with low polymer chain flexibilities. This concept is discussed in detail in a paper by R. W. Baker and H. K. Lonsdale entitled "Controlled Release Mechanisms and Rates" in *Controlled Release of Biologically Active Agents*, A. C. Tanquery and R. E. Lacey (Eds.), Plenum Press, New York (1974).

One method of decreasing chain flexibility is to crosslink the polymer. For example, R. N. Barrer and G. Skirrow, in an article entitled "Transport and Equilibrium Phenomena in Gas-Elastomer Systems I. Kinetic Phenomena," *J. Poly. Sci.* 3,549 (1948), showed that with a series of sulfur-crosslinked rubbers that the diffusion coefficient becomes smaller as the degree of crosslinking is increased. There is an approximate linear dependence of D on the reciprocal of the molecular weight between crosslinks. Similar effects have been observed by Stannett et al. with radiation-crosslinked polyethylene. (V. Stannett, M. Szwasc, R. L. Bharagava, J. A. Meyer, A. W. Meyers and C. E. Rogers, "Permeability of Plastic Films and Coated Paper to Gases and Vapors," Tappi Monograph #23, New York, (1962).) Crystalline or glassy regions in the polymer can also act as pseudo crosslinks.

The second factor influencing permeant flux in Equation 2 is the distribution coefficient of the permeant in the membrane. This coefficient is sensitive to both the polarity and morphology of the permeant. Theories of solubility exist, but at the present time the ability to predict permeant solubilities in polymers is rudimentary. However, a useful guide is the solubility parameter concept described by J. Hilderbrand and R. Scott, in *The Solubility of Non-Electrolytes*, Reinhold Publishing Corp., New York, (1949). The solubility parameter is valuable in predicting solubilities and sorption in polymers since it can be shown that a polymer will most efficiently sorb the material whose solubility parameter is closest to its own. The solubility parameter for water is 25, while those for organic molecules similar to common hazardous amines are between 10 and 14. Thus it is to be expected that highly polar polymer membranes, or even charged membranes with high solubility parameters will have the maximum partition coefficients for water and minimum for toxic vapors.

The preferred permselective layer then will normally be selected from hydrophilic, polar polymers with rigid, inflexible backbones, such as crosslinked or glassy polymers. Examples of polymers which can be employed in the practice of this invention are included in U.S. Pat. No. 4,486,202 to Malon et al., column 6, line 37 through column 7, line 7, which patent is incorporated herein by way of reference. Preferred polymers that may be mentioned are cellulose acetate and cellulose nitrate, especially in the more hydrophilic grades, acrylate copolymers, polyacrylonitrile and acrylonitrile copolymers, polyamides with appropriate glass transition temperatures, and the more rigid grades of polyurethanes. Particularly useful in the context of the invention are cellulose acetate (for example 398-10 available from Eastman Kodak, Rochester, N.Y.) ethylcellulose (Ethocel ®, Dow Chemical, Midland, Mich.), nitrocellulose (60-80) Polysciences, Warrington, Pa.) and polyvinylacetate (Polysciences, Warrington, Pa.). Because the base onto which the permselective layer is deposited is smooth and defect-free, it is possible, using the techniques hereinafter set forth in detail, for this permselective layer to be extremely thin. High fluxes of water vapor, consistent with the demands of Table 1, are therefore possible. The thickness of the permselective layer will normally be in the range 0.1 to 2 microns, preferably 1.5 microns or thinner, and will depend in part on the characteristics of the polymer selected for the layer.

It should be understood that the lists given above of polymers, solvents and so on, from which the several layers of the composite material may be made, and the theoretical principles described, are intended to be representative of the kinds of components that may be used. They are exemplary rather than exclusive, and should not be interpreted as limiting the scope of the invention in any way.

Figure 2:
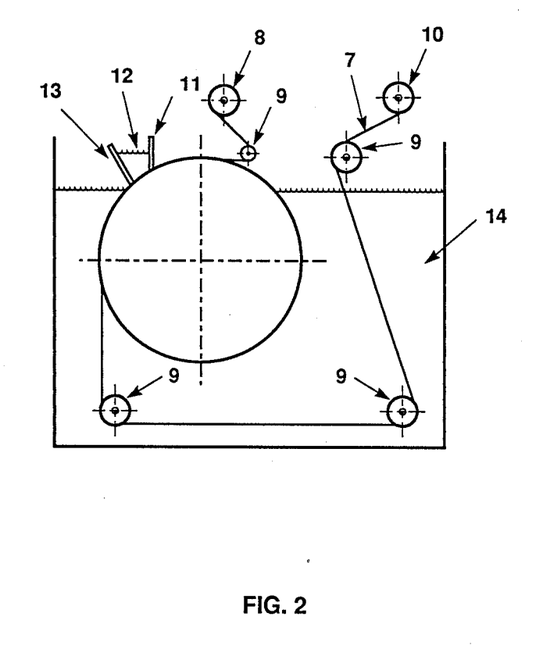
FIG. 2 shows a schematic representation of a Loeb-Sourirajan membrane casting machine.

Preparation of the microporous support membrane for the present invention is best achieved by the process established for the manufacture of asymmetric Loeb-Sourirajan reverse osmosis membranes, that is, casting an appropriate polymer solution onto the chosen fabric support. FIG. 2 is a schematic representation of a Loeb-Sourirajan membrane casting machine. Referring now to this figure, a moving belt of the fabric web, 7, feeds from the fabric roll 8, across a series of rollers 9, to the take-up roll 10. A trough 11, contains the casting solution 12, which consists of a polymer solution dissolved in a water miscible solvent. The casting solution is doctored onto the moving fabric belt by means of a blade 13. The belt then passes into a water bath 14 which precipitates the polymer to form the membrane. The belt is collected on the take-up roll 10, after which it is washed overnight to remove any remaining solvent and finally dried.

Figure 3:
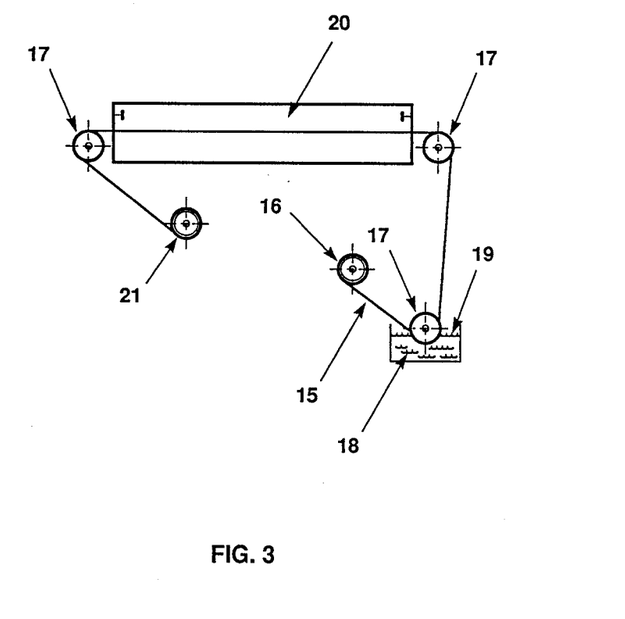
FIG. 3 shows a schematic representation of a dip-coating apparatus used to prepare composite membranes.

Thin film composite membranes may then be constructed on the microporous support by a number of techniques known in the art. There are two preferred methods in the context of the present invention; coating with a dilute polymer solution and interfacial polymerization. The former is described in detail in, for example, a paper by R. L. Riley, H. K. Lonsdale, D. R. Lyons and U. Merten, entitled "Preparation of Ultrathin Reverse Osmosis Membranes and the Attainment of the Theoretical Salt Rejection" in *J. Appl. Poly. Sci.* 11, 2143, (1967); and in a recent U.S. Pat. No. 4,234,701 to R. L. Riley and R. L. Grabowsky. In this method, a very dilute solution of the desired polymer is prepared in a volatile solvent. A thin film of the polymer solution is deposited on the microporous support surface by immersing and then slowly withdrawing the support from the solution. When the solvent evaporates, an extremely thin polymer layer is left behind. Alternatively, the thin polymer film can be deposited first on a surface such as a glass plate, and then floated off onto a water surface and deposited on the microporous substrate in a separate operation. FIG. 3 is a schematic representation of a simple dipcoating apparatus, which can be used to deposit both the optional sealing and top layers and the permselective layer of the composite membrane. Referring now to this figure, the support membrane 15, passes from the feed roll 16 across a series of rollers 17. The dipcoating tank 18 contains a dilute solution 19, of the polymer to be deposited, which coats the traveling membrane support with a liquid layer 50 to 100 microns thick. The membrane then passes through a drying oven 20 and is wound up on a variable-speed, motor-driven take-up roll 21. After evaporation of the solvent, a polymer film 0.1 to 20 microns thick is left on the membrane. The thickness and the number of defects in the coating depend on the concentration and viscosity of the solutions involved, the nature of the support membrane and the application parameters of the process. With skillful tailoring of these variables, it is possible to obtain a defect-free sealing layer or top layer as thin as 0.7 micron and a permselective layer as thin as 0.1 micron.

Figure 4A:
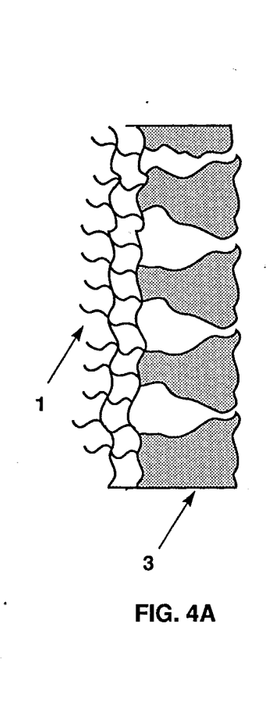
FIGS. 4A–4C shows a schematic representation of a typical composite membrane prepared by the interfacial polymerization process.
Figure 4B:
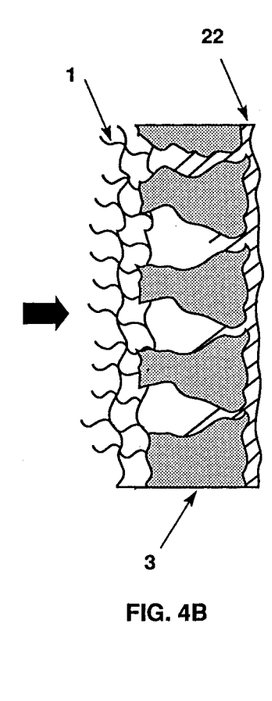
Figure 4C:
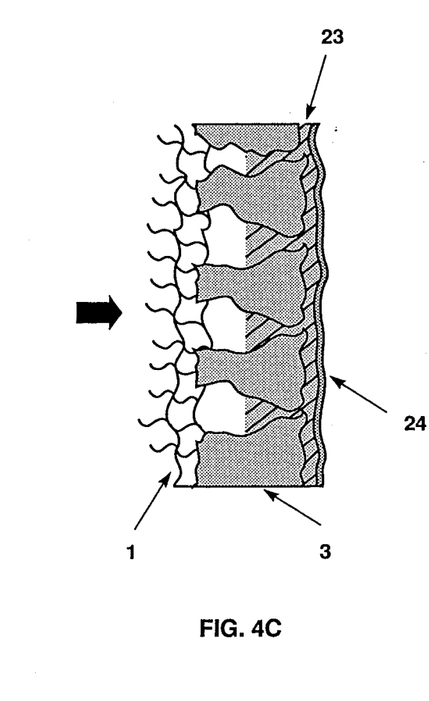

Interfacial polymerization, an alternative preferred method of forming a permselective layer on top of a microporous support, is discussed in detail in, for example, a paper entitled "Non-Polysaccharide Membranes for Reverse Osmosis: NS-100 Membranes," by L. T. Rozelle, J. E. Cadotte, K. E. Cobian and C. V. Koppfer in *Reverse Osmosis and Synthetic Membranes*, S. Sourirajan (Ed.), National Research Council of Canada, Ottawa, (1977). The principle of the method involves bringing two reactive monomers, each in different immiscible solvents, into contact. The monomers are able to react only at the interface of the two liquids, where a polymer film forms. The concept is applied to the preparation of composite membranes by first depositing a solution of a reactive prepolymer in the surface pores of the microporous substrate. The membrane is then immersed in a solution of a reactant that causes the polymer to polymerize further and/or crosslink. Finally the membrane is dried at an elevated temperature. A typical resulting composite membrane is shown schematically in FIG. 4. The microporous substrate 3 is coated with the unreacted prepolymer solution 22. After the interfacial reaction and heat curing are complete, the membrane comprises the microporous support 3 as before, a polymerized intermediate transport layer 23, and the ultrathin crosslinked reacted polymer layer 24, that gives the membrane its permselective properties. The chemistry of interfacial polymerization makes this method particularly desirable where highly crosslinked hydrophilic polymer end products are needed. Depending on the conditions under which the polymerization is carried out, and the nature of the prepolymers, reactants and solvents used, it is possible to vary the thickness and properties of the resulting barrier films in the same way as with the coating method.

The composite fabric material described above may be used to make protective clothing, either in the form of complete suits, or individual garments, by a variety of techniques known in the art. The simplest method is conventional sewing. In this case an adhesive or sealant should be incorporated into the seams to prevent leaking. Other methods that can be used include, but are not limited to, adhesive bonding, with or without the application of heat or pressure or both, or electronic bonding, particularly by means of radio frequency heating.

The processes and components described above result in a composite fabric material that has improved resistance to permeation by toxic vapors and good water vapor and heat transmission properties. Furthermore, polymers can be chosen for the various layers which have a reasonable measure of flammability resistance, thereby affording some emergency fire protection to the wearer. From the description of the techniques for constructing the composite material above, it will be apparent that the finished material has a very smooth, non-porous surface. This is extremely advantageous, since toxic agents in liquid or aerosol form will not be able to penetrate. In addition, the absence of pores, interstices, cracks or other discontinuities which might trap molecules of the toxic agent on the surface of the garment, permits simple decontamination of the garment after exposure to hazardous agents, for example by flushing with running water. The garment may also be cleaned by simple laundering or rinsing, and is then ready for re-use. This offers a substantial advantage over other types of protective clothing, which absorb the toxic agents to which they are exposed and thereby become a hazard of themselves, creating a decontamination problem which is frequently difficult and/or expensive to deal with, and which may result in the garment being disposed of after only one wearing. Thus it can be seen that the material of the present invention, and protective clothing made from this material, have many advantages over existing materials and garments.

The following examples are given by way of illustration to further clarify the nature of the invention. They are not exclusive.

EXAMPLE 1

A solution of 18% polyvinylidene fluoride (Kynar ®, Pennwalt Corp., Philadelphia, PA) in DNAc was cast onto a spun-bonded polyethylene fabric (Tyvek ®, Grade 1422A, DuPont, Wilmington, Del.) using the membrane casting machine shown in FIG. 2. The resulting membrane was coated with silicone rubber, RTV 615A and B (General Electric Co., Waterford, N.Y.) dissolved in iso-octane, using the coating machine shown in FIG. 3. The result was a silicone rubber sealing layer 1 micron thick. A permselective top coat of nitrocellulose 60-80 (Polysciences, Warrington, PA) 1.2 microns thick was coated onto the composite in the same way.

The water vapor permeability of the composite membrane material was measured in a test cell consisting of two chambers separated by the material. The volume of each chamber was 75 cm$^3$, and a typical air flow/chamber was 20 cm$^3$/min. One chamber was filled with dry air (RH 0-10%), the other with humid air (RH 70-80%). The permselective top layer faced the dry air stream. The water vapor permeability, normalized to a transmembrane driving force of 100% RH, is given by:

$$\text{Water vapor permeability} = \frac{\phi(RH_4 - RH_3) \cdot K}{A\,(RH_2 - RH_4)/100} \quad (3)$$

where $\phi$ is the volume flow of dry air through a cell of membrane area A, $RH_4 - RH_3$ is the change in relative humidity that occurs in the airstream as it passes through the cell, and $RH_2 - RH_4/100$ is the fractional RH driving force across the membrane. K is a constant which converts flux to g/m$^2$.hr. 100% RH. The relative humidities were measured by gas chromatography.

The permeability of the composite to methylamine vapor, chosen as a model for hydrazine, was measured using a test cell as above. The permselective layer faced the methylamine-rich side. Pure methylamine (Matheson, Searle Medical Products, Inc.) was diluted with nitrogen to make up a feed concentration varying from 1000 to 5000 ppm. The other chamber was flushed with pure nitrogen at a rate of 10 cm$^3$/min. The methylamine concentration in this chamber was determined by gas chromatography. The flux was normalized for a challenge concentration of 500 ppm. After eight hours, no methylamine could be detected in the flowing nitrogen stream. The flow was stopped to create a dead volume, and methylamine concentrations were measured as a function of time.

The permeability of the composite to nitrogen tetroxide was measured using the same procedure. The challenge concentration in this case was 520 ppm (520 ppm nitrogen tetroxide supplied by Matheson, Searle Medical Products, Inc.) Nitrogen tetroxide concentrations were measured using a colorimetric method.

Typical results are summarized in Table 2.

TABLE 2

Permeation rates through Tyvek ®/Kynar ®/silicone rubber/nitrocellulose composite material.

| Vapor | Permeation rate mg/m$^2$.hr* | Concentration** ppm* |
|---|---|---|
| Water | 1.45 × 10$^5$   (2.0 × 10$^5$) | — |
| Methylamine | <0.2   (<0.65) | <3 (<10) |

TABLE 2-continued

Permeation rates through Tyvek ®/Kynar ®/silicone rubber/nitrocellulose composite material.

| Vapor | Permeation rate mg/m$^2$.hr* | Concentration** ppm* |
|---|---|---|
| N$_2$O$_4$ | <0.8 (<1.0) | <8 (<10) |

*Target values in ( )
**Calculated concentration in suit after exposure of 1 hour to 500 ppm.

EXAMPLE 2

A composite material was prepared using the procedures described in Example 1. In this case the fabric web was non-woven polyester (Hollytex®, Eaton Dikeman, Mt. Holly Springs, Pa.) the microporous substrate was Kynar as before, the sealing layer was silicone rubber 1.5 microns thick, and the permselective top layer was cellulose acetate 398-10 (Eastman Kodak, Rochester, N.Y.) 0.5 microns thick.

Permeability tests where conducted as described in Example 1. Typical results are summarized in Table 3.

TABLE 3

Permeation rates through Hollytex ®/Kynar ®/silicone rubber/cellulose acetate composite material.

| Vapor | Permeation rate mg/m$^2$.hr* | | Concentration** ppm* |
|---|---|---|---|
| Water | 1.3 × 10$^5$ | (2.0 × 10$^5$) | — |
| Methylamine | 1.3 | (<0.65) | 19 (<10) |
| N$_2$O$_4$ | 8.3 | (<1.0) | 83 (<10) |

*Target values in ( )
**Calculated concentration in suit after exposure of 1 hour to 500 ppm.

EXAMPLE 3

A composite material was prepared using the procedures described in Example 1. In this case the fabric web was Hollytex®, the microporous substrate was Kynar®, the sealing layer was silicone rubber 2.5 microns thick and the permselective top layer was polyvinylacetate (Polysciences, Warrington, PA) with a thickness of 7 microns. Permeability tests were conducted as above. Typical results are summarized in Table 4.

TABLE 4

Permeation rates through Hollytex ®/Kynar ®/silicone rubber/polyvinylacetate composite material.

| Vapor | Permeation rate mg/m$^2$.hr* | | Concentration** ppm* |
|---|---|---|---|
| Water | 0.34 × 10$^5$ | (2.0 × 10$^5$) | — |
| Methylamine | <0.2 | (<0.65) | <3 (<10) |
| N$_2$O$_4$ | 1.5 | (<1.0) | 15 (<10) |

*Target values in ( )
**Calculated concentration in suit after exposure of 1 hour to 500 ppm.

We claim:

1. Protective clothing, comprising at least one garment, said garment being fabricated from a composite material comprising:
   a clothing fabric layer, coated with;
   a microporous support membrane, coated with;
   an ultrathin permselective membrane.

2. The protective clothing of claim 1, further comprising a sealing layer coating one surface of said ultrathin permselective membrane.

3. The protective clothing of claim 1 or 2, wherein the clothing fabric layer is made from at least one polymer selected from the group consisting of polyesters, polyamides, polyolefins, acrylics, and polyimides.

4. The protective clothing of claim 1 or 2, wherein the microporous support membrane is made from a polymer selected from the group consisting of polysulfones, polyamides, crosslinked polyimides, polyetherether ketones and polyvinylidine fluoride.

5. The protective clothing of claim 2, wherein the sealing layer is silicone rubber.

6. The protective clothing of claim 1 or 2, wherein the permselective membrane is made from a crosslinked polymer.

7. The protective clothing of claim 1 or 2, wherein the permselective membrane is made from at least one polymer selected from the group consisting of cellulose acetate, cellulose nitrate ethylcellulose, acrylic copolymers, polyacrylonitrile copolymers, polyamides and polyurethanes.

8. The protective clothing of claim 1 or 2, wherein the thickness of the microporous support membrane is between 30 and 200 microns.

9. The protective clothing of claim 2, wherein the thickness of the sealing layer is between 0.1 and 5 microns.

10. The protective clothing of claim 1 or 2, wherein the thickness of the permselective membrane is between 0.05 and 5 microns.

11. The protective clothing of claim 1 or 2, wherein the water vapor permeability of the material is at least 50 g/m$^2$. hr, normalized to 100%RH.

12. The protective clothing of claim 1 or 2, wherein the permeability of the material for organic vapors is less than 2 mg/m$^2$. hr.

13. The protective clothing of claim 1 or 2, wherein the permeability of the material to nitrogen tetroxide is less than 2 mg/m$^2$. hr.

14. The protective clothing of claim 1 or 2, wherein the permeability of the material to an organic vapor selected from the group consisting of hydrazine, monomethyl hydrazine and dimethyl hydrazine, is less than 2 mg/m$^2$. hr.

15. The protective clothing of claim 1 or 2, wherein the multilayer composite semipermeable membrane is prepared by the solution coating method.

16. The protective clothing of claim 1 or 2, wherein the multilayer composite semipermeable membrane is prepared by the interfacial polymerization method.

17. A method of rendering a clothing fabric impermeable to organic agents, comprising:
   coating the clothing fabric with a microporous support membrane; and,
   coating the microporous support membrane with a nonporous, ultrathin permselective membrane.

18. The method of claim 17, further comprising a step in which a sealing layer is coated in contact with at least one surface of said permselective membrane.

19. The method of claim 17, wherein said coating steps result in a coated clothing fabric having a water vapor permeability of at least 50 g/m$^2$. hr.

20. The method of claim 17, wherein said coating steps result in a coated clothing fabric having an organic vapor permeability less than 2 mg/m$^2$. hr.

21. The method of claim 17, wherein said coating steps result in a coated clothing fabric having a hydrazine permeability less than 2 mg/m$^2$. hr.

22. A method of protecting a person from toxic organic agents, comprising clothing said person in at least one garment fabricated from a composite material comprising:
   a fabric layer, coated with;
   a microporous support membrane, coated with;
   an ultrathin permselective membrane.

* * * * *